United States Patent [19]
Irikura

[11] Patent Number: 5,755,098
[45] Date of Patent: *May 26, 1998

[54] AXLE DRIVING APPARATUS

[75] Inventor: Koji Irikura, Amagasaki, Japan

[73] Assignee: Kanzaki Kokyukoki Mfg. Co. Ltd., Japan

[*] Notice: The term of this patent shall not extend beyond the expiration date of Pat. Nos. 5,515,677 and 5,367,877.

[21] Appl. No.: 612,791

[22] Filed: Mar. 11, 1996

Related U.S. Application Data

[63] Continuation of Ser. No. 332,076, Nov. 1, 1994, Pat. No. 5,515,677, which is a continuation of Ser. No. 950,718, Sep. 25, 1992, Pat. No. 5,367,877.

[30] Foreign Application Priority Data

Sep. 27, 1991 [JP] Japan ................. 3-248967

[51] Int. Cl.$^6$ ................. F16D 31/02; F16D 39/00
[52] U.S. Cl. ................. 60/435; 60/487; 180/53.1
[58] Field of Search ................. 91/495; 92/12.2, 92/57, 71; 60/487, 488, 489, 490, 435; 180/53.1, 53.3, 53.8

[56] References Cited

U.S. PATENT DOCUMENTS

| | | |
|---|---|---|
| 3,319,731 | 5/1967 | Kennel . |
| 3,550,712 | 12/1970 | Feldman . |
| 4,262,768 | 4/1981 | Itatani et al. . |
| 4,304,141 | 12/1981 | Tone et al. . |
| 4,498,349 | 2/1985 | Nishihara . |
| 4,658,662 | 4/1987 | Rundle . |
| 4,727,759 | 3/1988 | Yamaoka et al. . |
| 4,784,013 | 11/1988 | Yamaoka et al. . |
| 4,870,820 | 10/1989 | Nemoto . |
| 4,882,940 | 11/1989 | Yamaoka et al. . |
| 4,896,506 | 1/1990 | Shivvers et al. . |
| 4,914,907 | 4/1990 | Okada . |
| 4,922,787 | 5/1990 | Fujisaki et al. . |
| 4,932,209 | 6/1990 | Okada et al. . |
| 4,986,073 | 1/1991 | Okada . |
| 5,046,994 | 9/1991 | Hasegawa et al. . |
| 5,511,436 | 4/1996 | Hasegawa et al. . |

FOREIGN PATENT DOCUMENTS 2622655  5/1989  France .

*Primary Examiner*—Hoang Nguyen
*Attorney, Agent, or Firm*—Sterne, Kessler, Goldstein & Fox P.L.L.C.

[57] ABSTRACT

An axle driving apparatus which houses a hydraulic transmission and axles in an axle casing. A pump shaft projects outwardly from the axle casing for inputting engine power. A power take-off shaft, connected in association with the pump shaft, is juxtaposed with the pump shaft in the axle casing, whereby there is no need to separately provide a power take-off route from the engine to the hydraulic transmission. A power transmission route from the engine to the hydraulic transmission is also used as a power take-off route, thereby enabling the power take-off shaft to be driven. The power take-off shaft is juxtaposed in the vicinity of the axle casing to simplify power transmission from the power take-off shaft to a working machine.

8 Claims, 7 Drawing Sheets

5,755,098

1

AXLE DRIVING APPARATUS

This application is continuation of application Ser. No. 08/332,076, filed Nov. 1, 1994 (allowed) now U.S. Pat. No. 5,515,677, which is a continuation of application Ser. No. 07/950,718 filed Sep. 25, 1992, now U.S. Patent No. 5,367,877.

FIELD OF THE INVENTION

The present invention relates to an axle driving apparatus for a working car or vehicle which includes a power take off unit or working machine, such as a mower. More particularly, it relates to an axle driving apparatus which does not drive the working machine directly by an engine, but drives the same through a power takeoff shaft.

BACKGROUND OF THE INVENTION

A small-sized axle driving apparatus housing therein a hydraulic transmission is well known, as disclosed in U.S. Pat. Nos. 4,914,907, 4,932,209 and 4,986,073 filed by the present applicant.

However, such an axle driving apparatus is not provided with a power take-off shaft so that a working machine, such as a mower, is driven by an engine.

SUMMARY OF THE INVENTION

The axle driving apparatus of the present invention houses a hydraulic transmission, which includes a pump shaft for inputting engine power, in an axle casing. Axles connected in association with a motor shaft of the hydraulic transmission project outwardly from the axle casing. A power take-off shaft is connected in association with the pump shaft so that there is no need to separately provide a power take-off route from the engine to the power take-off shaft. A power transmission route from the engine to the hydraulic transmission is also used as a power take-off route to enable the power take-off shaft to be driven. Since the power take-off shaft is juxtaposed in the vicinity of the axle casing, the power transmission from the power take-off shaft to the working machine is simplified.

2

DESCRIPTION OF THE PREFERRED EMBODIMENT

Figure 1:
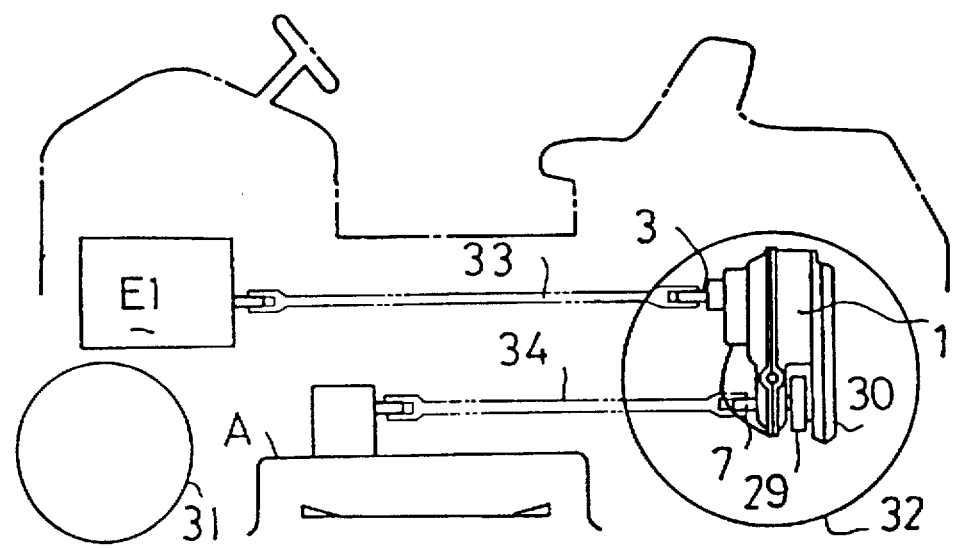
FIG. 1 is a side view of a power transmission system of a working car in which an axle driving apparatus is vertically disposed.

In FIG. 1, a power transmission route of a working car, which includes an engine E1 having a horizontal output shaft, is shown. A working machine A, such as a mower, is suspended between the front wheels 31 and rear wheels 32. Since the working machine A must be vertically movable, it is difficult to directly transmit power thereto from the horizontal output shaft type engine E1. The power is transmitted once, from the horizontal output shaft type engine E1 to the axle driving apparatus through a joint shaft 33. The power is then transmitted from a power take-off shaft 7 provided at the axle driving apparatus through a joint shaft 34 to the working machine A. Such structure puts the power take-off shaft 7 lower than a crank shaft of the horizontal output shaft type engine E1 which facilitates power transmission. Through the use of a universal joint, the working machine A can move vertically through a large stroke range. Clutch means 29 are disposed between the power take-off casing 30 and the power take-off shaft 7.

Figure 2:
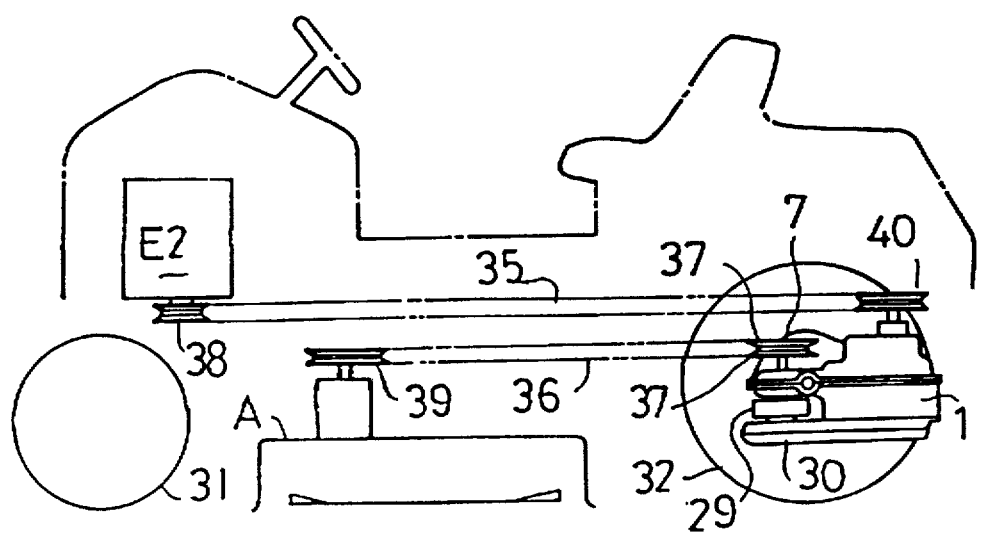
FIG. 2 is a side view of a power transmission system of a working car in which an axle driving apparatus is horizontally disposed.

In FIG. 2, a working car which includes an engine E2, having a vertical output shaft is shown. Power is transmitted once, from the vertical output shaft type engine E2 to an input pulley 40 at the rear of the axle driving apparatus through a V-belt 35. Power is thereafter transmitted from a power take-off pulley 37 at the power take-off shaft 7 to an input pulley 39 at the working machine A through a V-belt 36. Such structure can interpose a long V-belt 36 between the input pulley 39 and the power take-off pulley 37, whereby, even when the working machine A moves vertically, the V-belt 36 remains in contact with pulley 39.

Figure 3:
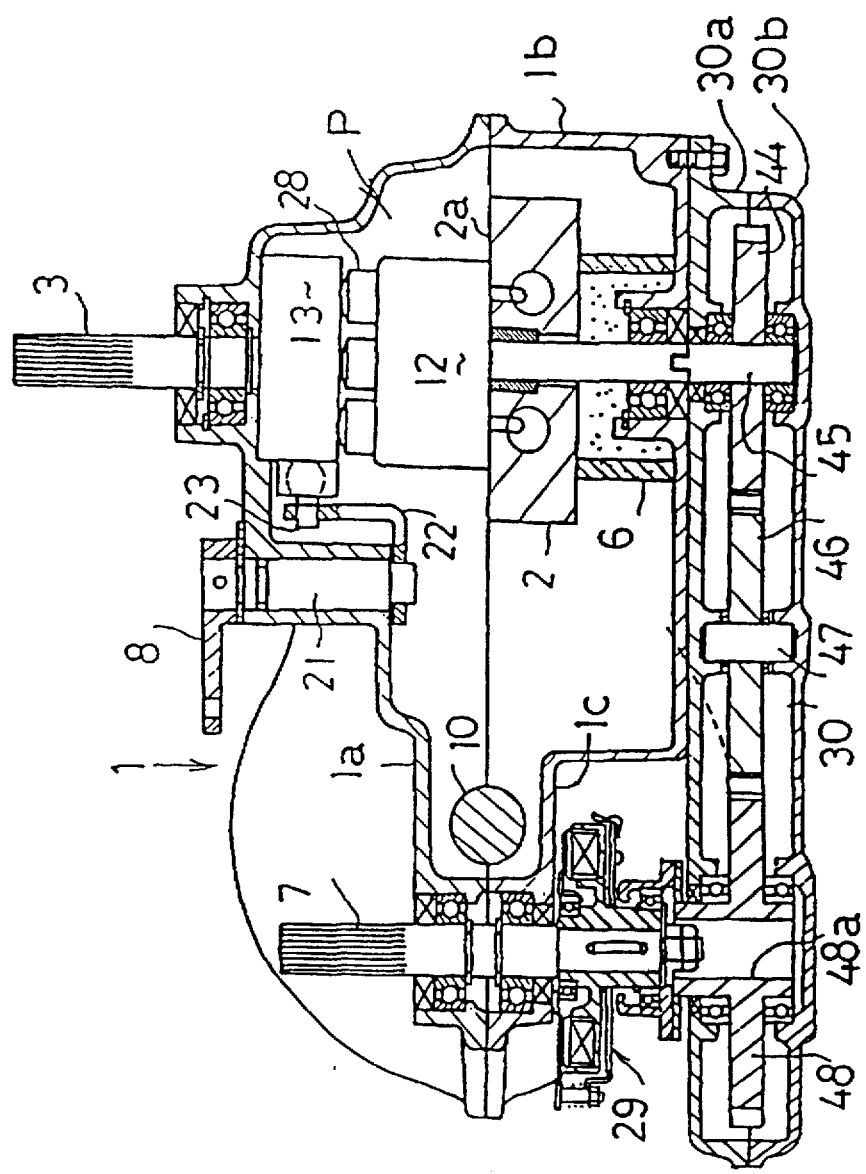
FIG. 3 is a sectional side view of an axle driving apparatus of the present invention taken on the axes of a pump shaft 3 and a power take-off shaft 7.

A sectional side view of an axle driving apparatus of the present invention is shown in FIG. 3, in which an axle casing 1 can be horizontally separated on the axes of axle 10 and motor shaft 4 into a half casing 1a and a half casing 1b. The two half casing 1a and 1b are coupled together, sandwiching between the juncture surfaces, the axle 10 and a bearing for the motor shaft 4. In the present invention, a power take-off casing 30 is attached to the outer surface of the half casing 1b. The power take-off casing 30 also comprises a half casing 30a and a half casing 30b coupled with each other. A recess 1c is formed on the outer surface of the half casing 1b and in the vicinity of the axle 10. Clutch means 29 is disposed between the recess-1c and the power take-off casing 30. In this embodiment, power take-off shaft 7 extends perpendicularly across the junction surface between half casings and 1b and is rotatably supported by axle casing 1. One end of the power take-off shaft 7 projects from the axle casing so that a joint shaft 34 or a power take-off pulley 37 can be attached to the projecting end.

Figure 4:
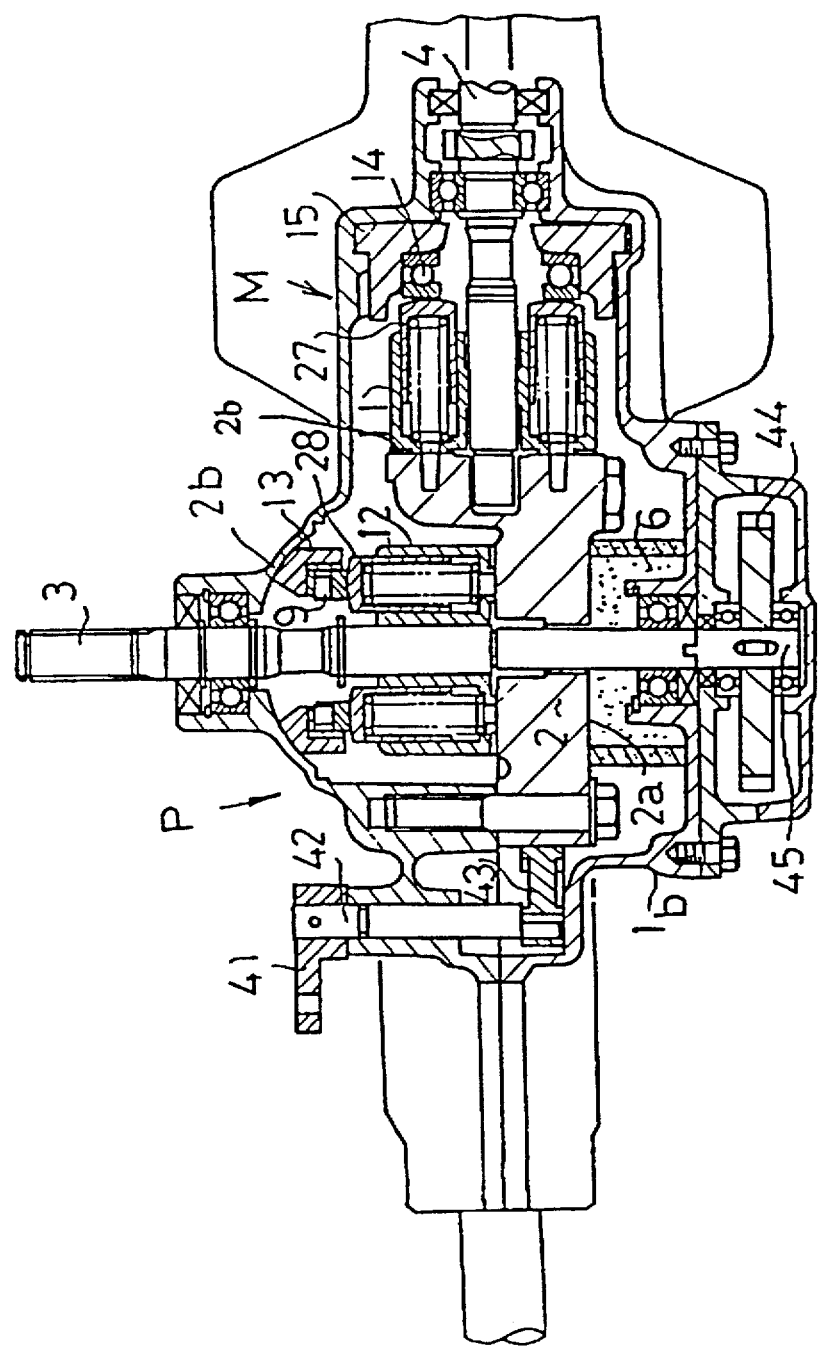
FIG. 4 is a sectional front view of an axle driving apparatus taken on the axis of a pump shaft 3.
Figure 5:
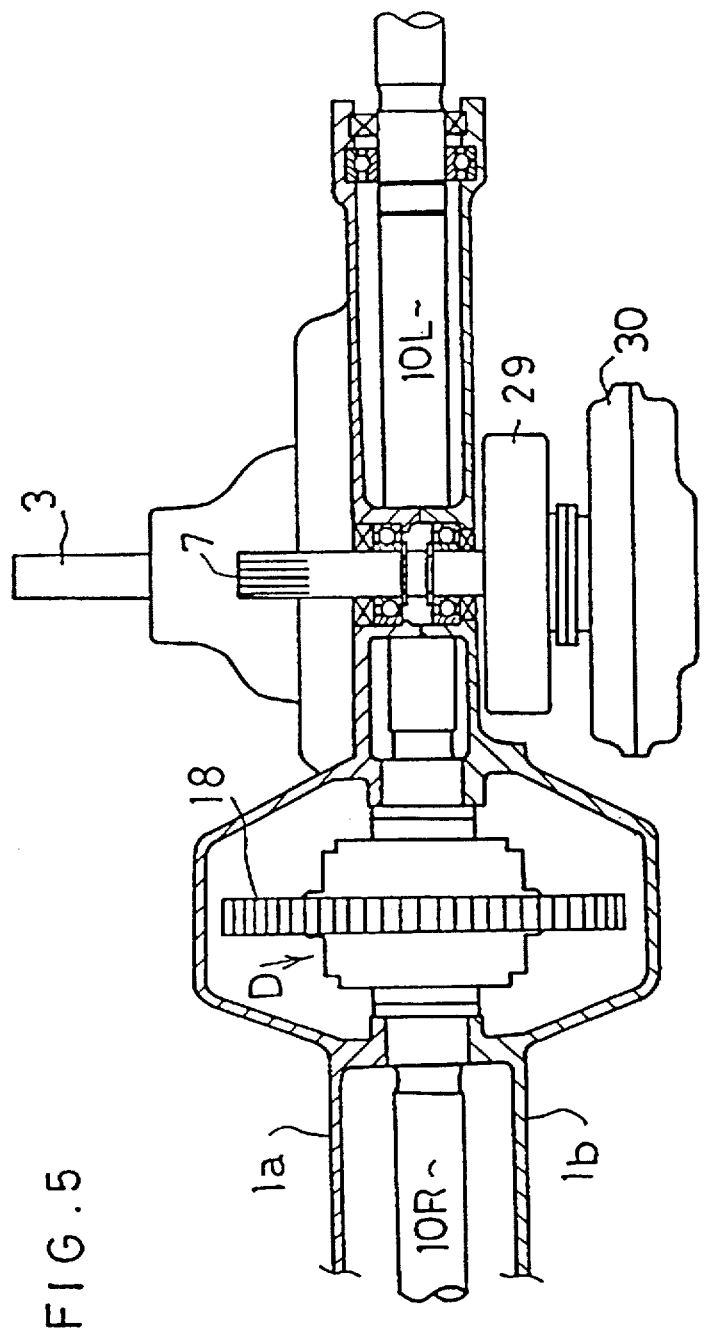
FIG. 5 is a sectional front view of an axle driving apparatus taken on the axis of an axle 10.

As shown in FIG. 4, a hydraulic transmission comprising a hydraulic pump P and a hydraulic motor M is disposed within the axle casing I on an L-like shaped center section 2. A hydraulic pump P is disposed on a pump mounting surface 2a formed along the horizontal surface of the center section 2. A hydraulic motor M is disposed on a vertical motor mounting surface 2b of the center section 2. The hydraulic pump comprises a movable swash plate 13, a thrust bearing 9, pump pistons 28 and a cylinder block 12. In order to operate the movable swash plate 13 from the exterior of the axle casing 1, a speed change lever 8, a speed change lever shaft 21, a swash plate rotation arm 22, and a swash plate rotation projection 23 are provided (see FIG. 7). The speed change lever 21 is pivoted to the half casing 1a. An oil filter 6 is disposed between the lower surface of the center section 2 and the inner surface of the bottom of the half casing 1b.

The pump shaft 3 projects through the center section 2 at the end face thereof, passing through the oil filter 6 to reach the outer surface of the half casing 1b. The end face of the pump shaft 3 is juxtaposed or connects with an input shaft 45 at the power take-off casing 30. When the power take-off route is not required, the power take-off casing 30 is removed by separating input shaft 45 from the lower end of pump shaft 3, and the lower end of the pump shaft 3 may be covered with a lid.

Figure 7:
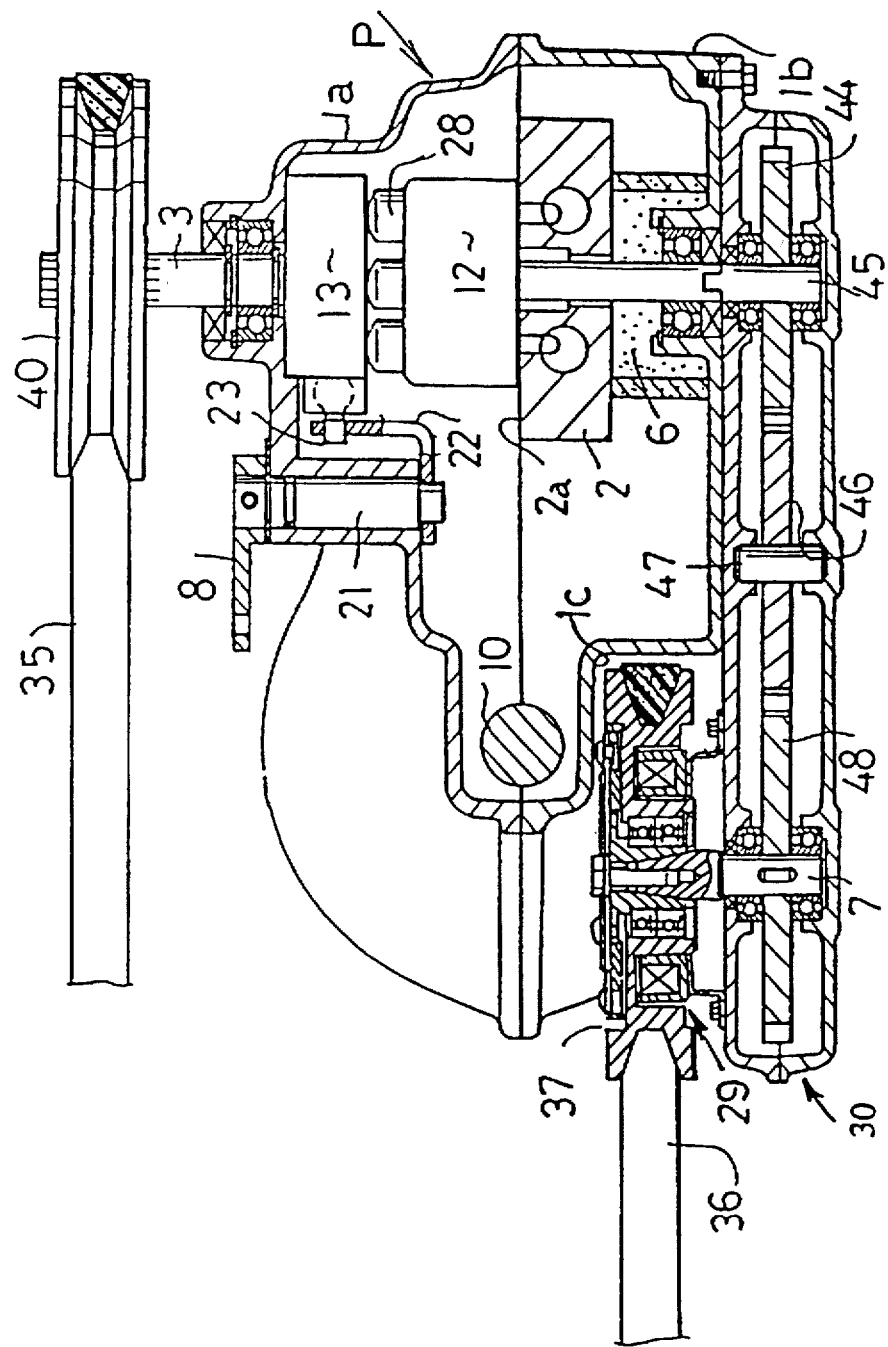
FIG. 7 is a sectional side view of an axle driving apparatus in which a power take-off pulley 37 is disposed between axle casing 1 and a power take-off casing 30.

The power take-off casing 30 is affixed to the outer surface of the half casing 1b. As seen in FIGS. 3 and 7, input shaft 45, gears 44, 46, and 48 are disposed within the power take-off casing 30. These gears comprise the power take-off route whereby power is transmitted from the pump shaft 3 to the power take-off shaft 7. A counter shaft 47 for freely supporting the gear 46, and an output shaft 48a on which the gear 48 is fixed, are also disposed-in power take-off casing 30. The rotation of pump shaft 3 is transmitted into the power take-off casing 30 through the input shaft 45 and then to the output shaft 48a through the gears 44, 46, and 48. A flange is provided at one axial end of the output shaft 48a, and a clutch means 29 (for example, an electromagnetic clutch) is connected to the driving side. The power take-off shaft 7 is connected to the driven side.

FIG. 4 is a sectional view of the L-like shaped center section 2. A cylinder block 12 is mounted on the pump mounting surface 2a, and a cylinder block 11 of the hydraulic motor M is rotatably mounted on the vertical motor mounting surface 2b. The hydraulic motor M is provided with a fixed swash plate 15 and a thrust bearing 14. A plurality of motor pistons 27, freely fitted into the cylinder block 11, abut against the thrust bearing 14. A check valve is fitted in the pump mounting surface 2a of the center section 2. Biasing rods 50 (FIG. 6) are provided which open the check valve to short-circuit the high and low pressure closed circuits of the hydraulic transmission, thereby eliminating the output of hydraulic motor M. Also provided are a short-circuit operating arm 41 for operating the biasing rods 50, an operating shaft 42, and a branch operating arm 43.

An output transmitting gear 17 is fixed to the motor shaft 4, and engages with a counter gear 51 at a counter shaft 19. Another smaller diameter gear 52, at the counter shaft 19, engages with a ring gear 18 of a differential gear D. The differential gear D differentially connects a pair of axles 10L and 10R onto which the rear wheels 32 are mounted. A brake unit, comprised of a brake drum 16, is affixed to a portion of the motor shaft which projects outwardly from the axle casing 1.

Figure 6:
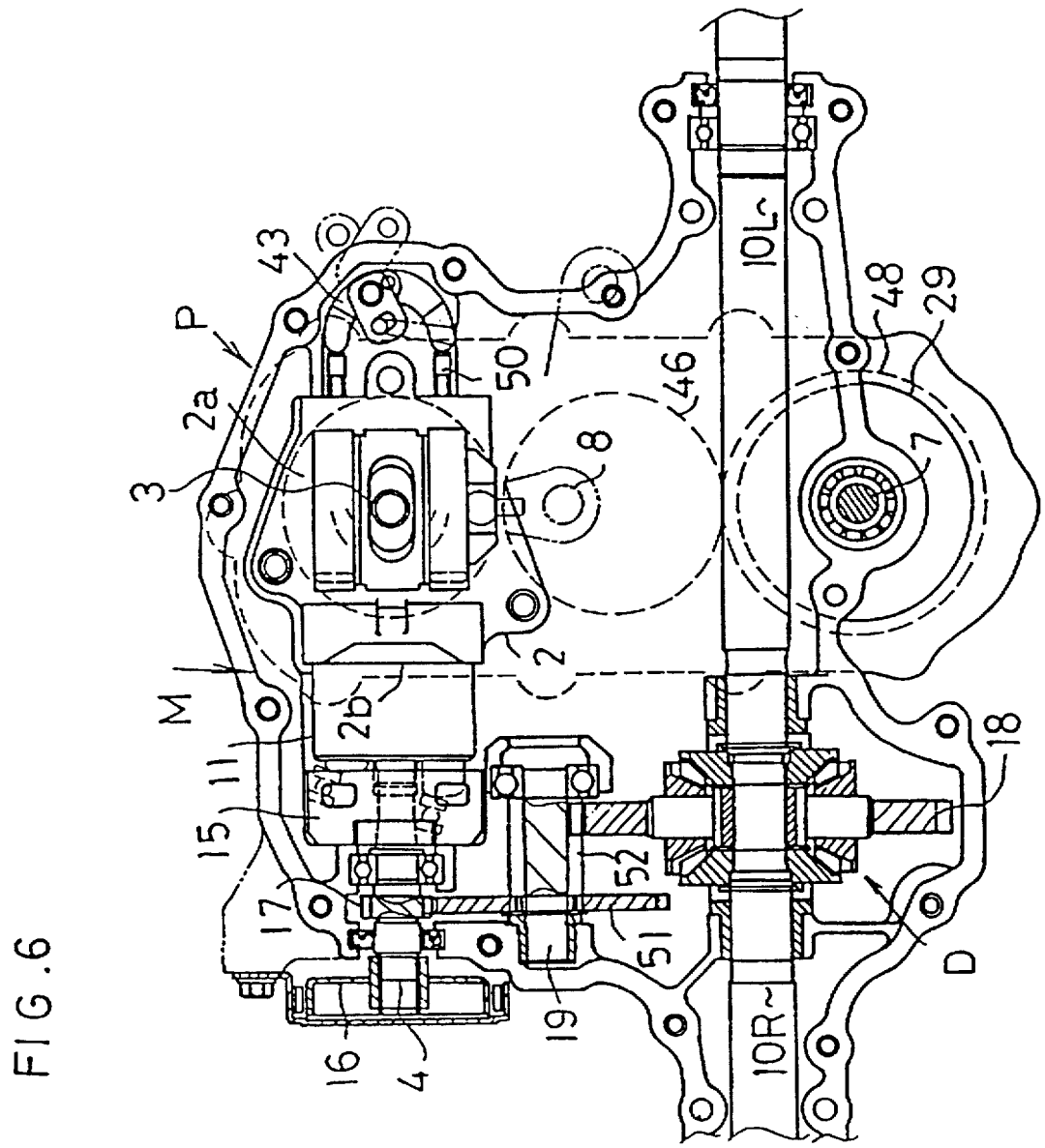
FIG. 6 is a plan view of an axle driving apparatus taken on the axes of axle 10 and a motor shaft 4 from which a half casing 1a is removed.

As best seen in FIG. 6, the axle driving apparatus of the present invention uses an L-like shaped center section 2 in which the rotary axes of pump shaft 3 and motor shaft 4 perpendicularly intersect with each other. The motor shaft 4 is connected in association with the differential gear D through the running power transmission route, gears 17, 18, 51 and 52, whereby a gap, extending in the power transmitting direction, is created between the pump shaft 3 and the axle 10L. The gap is utilized so that the power take-off shaft 7, parallel to the pump shaft 3, is provided in the vicinity of the axle 10L, and both the shafts 7 and 3 are connected in association with each other through the power take-off transmission route.

Explanation will now be given on a modified embodiment showing a different arrangement of power take-off pulley 37, as shown in FIG. 7. In this embodiment, the power take-off shaft 7 does not project to the upper surface of the axle casing 1, but a power take-off pulley 37 is freely fitted on the shaft end of the shaft 7. The power take-off pulley 37 is disposed in the recess 1c formed at the outer surface of axle casing 1. Within the power take-off pulley 37 is formed clutch means 29 for freely coupling the power take-off shaft 7 with the power take-off pulley 37. The remainder of the construction is the same as the previously discussed embodiment.

The power take-off shaft 7 in the above-mentioned embodiment is used as a middle power take-off shaft. It may be desirable to provide a rear power take-off shaft in addition to a middle power take-off shaft, as in the embodiment shown in FIG. 8. Accordingly, the axle driving -apparatus as shown in FIG. 8 is for vertical arrangement only.

Figure 8:
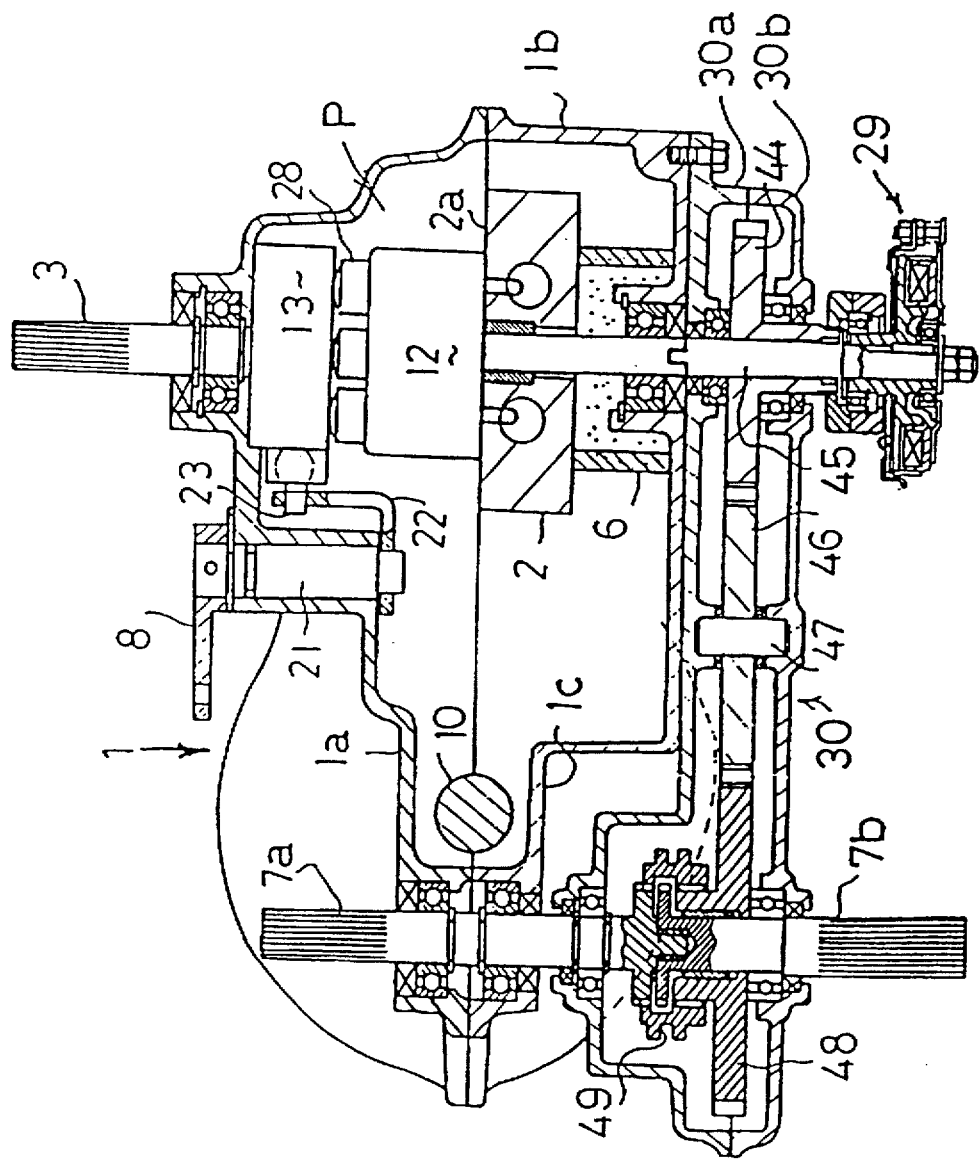
FIG. 8 is a sectional side view of an axle driving apparatus taken on the axes of a pump shaft 3 and power take-off shafts 7a and 7b.

In FIG. 8, the power take-off casing 30 attached to the outer surface of the half casing 1b is provided with a middle power take-off shaft 7a and a rear power take-off shaft 7b. In the power take-off casing 30, the input shaft 45 projects outwardly from the rear end of the power take-off casing 30, and connects to the driving side of clutch means 29. The end of gear 44, freely fitted onto the input shaft 45, similarly projects outwardly from the power takeoff casing 30, and a mounting flange is provided to connect to the driven side of the clutch means 29. The middle power take-off shaft 7a is supported by the axle casing 1. Rear power take-off shaft 7b is supported to the power takeoff casing 30, in the same construction with respect to the gear 48 as mentioned above. Shaft 7a and shaft 7b are coaxially disposed and freely fitting to each other.

A selection clutch means 49 is disposed on shafts 7a and 7b for selecting whether the gear 48 engages with the middle power take-off shaft 7a, the rear power take-off shaft 7b, or both the power take-off shafts 7a and 7b together. The selection clutch means 49 is disposed within the power takeoff casing 30 at a side of recess 1c of the half casing 1b. The selection clutch means 49 may be comprised of a hydraulic multi-plate type clutch or a mechanical clutch. The power transmission route to the power take-off shaft 7 comprises a gear train of gears 44, 46, and 48 in this embodiment, and may instead be formed of chain sprockets.

As seen from the above, the present invention can transmit power once from the engine to the axle driving apparatus through the joint shaft or V-belt, and drive the working machine A by the power take-off shaft 7 provided at the axle driving apparatus. Thus, the starting point of the power take-off route to the working machine A can be positioned at the axle driving apparatus, whereby the stroke for vertical movement of the working machine A can be made larger. The axle driving apparatus, when attached to the working car, can be disposed vertically as shown in FIG. 1, or horizontally as shown in FIG. 2.

When the power take-off casing 30, housing the power take-off route to the power take-off shaft 7, is juxtaposed with the axle casing 1, housing the running power transmission route, the axle casing can be restricted in width. Therefore, when the axle driving apparatus of the present invention is disposed vertically with respect to the body of the working car, the axle casing does not project rearwardly from the body. When the axle driving apparatus is disposed horizontally with respect to the body, the axle casing does not project at the lower surface thereof toward the ground, thereby enabling greater ground clearance.

What is claimed is:

1. An axle driving apparatus for a vehicle, comprising:
   an axle casing housing an axle and a hydraulic transmission for driving said axle;

a power input shaft for transmitting power from an engine to said hydraulic transmission, projecting outwardly from said axle casing;

a power output shaft for transmitting power from said hydraulic transmission to said a power take-off casing housing a power transmitting means for transmitting power from said hydraulic transmission, said power take-off casing attached to said axle casing so as to join said power transmitting means with said power input shaft; and a power take-off shaft for outputting power from said power transmitting means, projecting outwardly from said take-off casing;

wherein said power input shaft and said power take-off shaft are disposed substantially horizontal with respect to a vehicle body, and said power output shaft is disposed substantially vertical with respect to the vehicle body, when said axle driving apparatus is installed in an operative position on a vehicle, onto which an engine having a substantially horizontal power output shaft, is mounted.

2. An axle driving apparatus for a vehicle, comprising:

an axle casing housing an axle and a hydraulic transmission for driving said axle including a center section, wherein said axle casing comprises a first casing part and a second casing part which are joined with each other along a substantially vertical plane including an axis of said axle when said axle driving apparatus is installed in an operative position on a vehicle;

a power input shaft for transmitting power from an engine to said hydraulic transmission, projecting outwardly from said first casing part;

a power output shaft for transmitting power from said hydraulic transmission to said axle;

a power take-off casing housing a power transmitting means for transmitting power from said hydraulic transmission, said power take-off casing attached to said axle casing so as to join said power transmitting means with said power input shaft; and a power take-off shaft for outputting power from said power transmitting means, projecting outwardly from said take-off casing, wherein said power input shaft and said power take-off shaft are disposed substantially horizontal with respect to a vehicle body and said power output shaft is disposed substantially vertical with respect to the vehicle body, when said axle driving apparatus is installed in an operative position on a vehicle onto which an engine having a substantially horizontal power output shaft is mounted.

3. An axle driving apparatus for a vehicle, comprising:

an axle casing housing an axle and a hydraulic transmission for driving said axle;

a power input shaft for transmitting power from an engine to said hydraulic transmission projecting outwardly from said axle casing;

a power take-off casing housing a power transmitting means for transmitting power from said hydraulic transmission said power take-off casing attached to said axle casing; and a power take-off shaft for outputting power from said power transmitting means, projecting outwardly from said power take-off casing, wherein said power-take-off shaft is disposed substantially vertical with respect to a vehicle body when said axle driving apparatus is installed in an operative position on a vehicle onto which an engine having a substantially vertical power output shaft is mounted.

4. An axle driving apparatus for a vehicle according to claim 3, wherein said power input shaft is disposed substantially parallel to said power take-off shaft so as to be disposed substantially vertical with respect to said vehicle body.

5. An axle driving apparatus for a vehicle, comprising:

an axle casing housing an axle and a hydraulic transmission for driving said axle;

a power input shaft for transmitting power from an engine to said hydraulic transmission, projecting outwardly from said axle casing;

a power take-off casing housing a power transmitting means for transmitting power from said hydraulic transmission, said power take-off casing attached to said axle casing; and a power take-off shaft for outputting power from said power transmitting means, projecting outwardly from said take-off casing, wherein said power input shaft is disposed substantially vertical with respect to a vehicle body and at one side of a substantially vertical plane including an axis of said axle, and said power take-off shaft is disposed substantially vertical with respect to said vehicle body and at another side of said substantially vertical plane, when said axle driving apparatus is installed in an operative position on a vehicle onto which an engine having a substantially vertical power output shaft is mounted.

6. An axle driving apparatus for a vehicle according to claim 5, further comprising:

a working machine disposed between front wheels and rear wheels of said vehicle, wherein said power input shaft is spaced apart from said working machine and said power take-off shaft is disposed in proximity top said working machine.

7. An axle driving apparatus for a vehicle, comprising:

an axle casing;

an axle housed in said axle casing;

a hydrostatic transmission for driving said axle contained in said axle casing, wherein said hydrostatic transmission comprises a hydraulic pump, a hydraulic motor, and a center section having a first portion on which said hydraulic pump is mounted, and a second portion on which said hydraulic motor is mounted, for fluidly connecting each other;

a power take-off casing attached to one side wall of said axle casing, wherein said power take-off casing comprises a power take-off shaft and a power transmitting means connected with said power take-off shaft; and a power input shaft disposed substantially vertical with respect to a vehicle body, drivingly connected with a rotational axis of said hydraulic pump and extending in opposite directions from said hydraulic pump, wherein one axial end portion of said power input shaft projects outwardly from another side wall of said axle casing so as to receive power from an engine, and another axial end portion of said power input shaft is disposed throughout said first portion of said center section toward said one side wall of said axle casing so as to be connected with said power transmitting means within said power take-off casing.

8. An axle driving apparatus for a vehicle, comprising:

an axle casing;

a power take-off shaft provided in said axle casing;

an axle housed in said axle casing;

a hydrostatic transmission for driving said axle contained in said axle casing, wherein said hydrostatic transmission comprises a hydraulic pump, a hydraulic motor, and a center section fluidly connected with said hydraulic pump and said hydraulic motor;

a power input shaft drivingly connected with said hydraulic pump; and a pair of bearings provided in said axle casing for supporting an upper portion and a lower portion of said power input shaft so that said power input shaft is disposed substantially vertical with respect to a vehicle body;

wherein both axial end portions of said power input shaft extend in opposite directions from said pair of bearings, so that an upper end of said power input shaft projects outwardly from said axle casing in order to receive power from an engine and a lower end of said power input shaft is drivingly connected with said power take-off shaft.

* * * * *